A. & W. C. Wheeler,

Horse Power.

No 310

Reissued May 22, 1855

UNITED STATES PATENT OFFICE.

ALONZO WHEELER AND ALEXANDER F. WHEELER, (EXECUTOR OF WILLIAM C. WHEELER, DECEASED,) OF ALBANY, NEW YORK.

IMPROVEMENT IN ENDLESS-CHAIN HORSE-POWER.

Specification forming part of Letters Patent No. 2,157, dated July 8, 1841; Reissue No. 310, dated May 22, 1855.

*To all whom it may concern:*

Be it known that the following is a full, clear, and exact description of the improvement on the endless-chain horse-power for driving machinery invented by ALONZO WHEELER and WILLIAM C. WHEELER, formerly of the town of Chatham, in the county of Columbia and State of New York, reference being had to the accompanying drawings, which form part of this specification, and in which—

Figure 1:
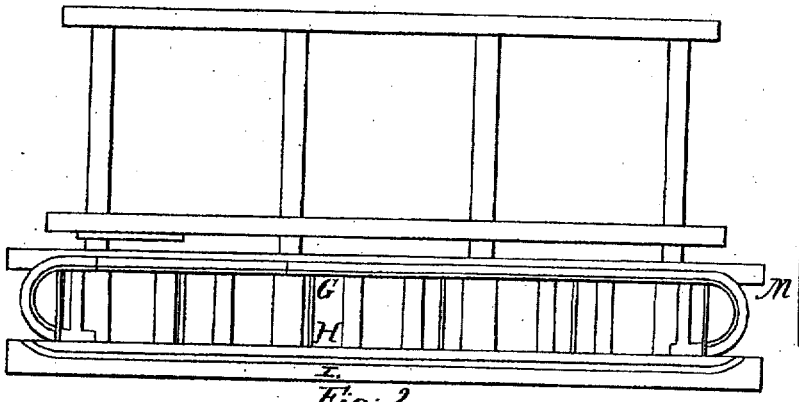
Figure 3:
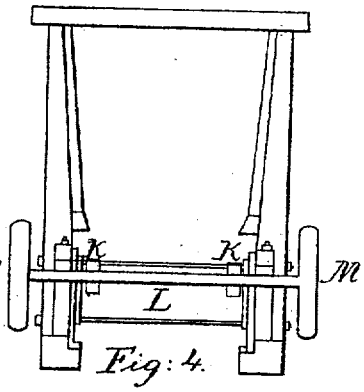
Figure 2:
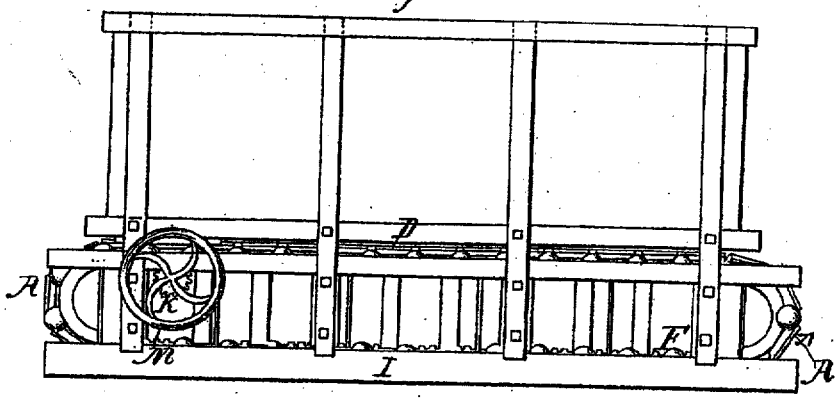
Figure 4:
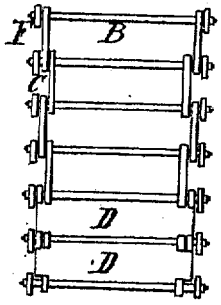

Figure 1 represents a longitudinal sectional elevation in part; Fig. 2, an outside longitudinal elevation of the improved horse-power complete; Fig. 3, a transverse vertical section in part; Fig. 4, a plan view of a portion of the endless chain traveling bed detached; and Fig. 5, a side view of two of the cog-links of the endless chain with lag-bolts, *et cetera.*

Endless chain horse-powers for driving machinery have been variously constructed. In some the parallel endless chains, one on either side, have been made with flat or open links, which mesh into and pass round or over toothed wheels or drums at the ends of the "power," for the purpose of supporting the chains, keeping them at their required stretch, and for converting the straight travel of the endless bed operated by the tread of the horse into a revolving driving prime mover, lags or boards extending the whole width across and secured to the links of the endless chains on either side form the traveling bed, which the horse by its tread sets in motion as or in the manner well known in machines of this description; and to induce an easy and proper run of the chains, anti-friction rollers have been arranged on the outside of the links and made to run on rails or ways forming part of the fixed framing. The open-link chain for this purpose, however, is objectionable in practice. The links do not mesh smoothly or fairly into the teeth or projections on the end drum or drums; and in other arrangements of "horse-power" of similar character a regular pitched cog-chain, made up of solid links or hinged cast iron plates with cogs on their one and inner face arranged to mesh into cogs on the peripheries of the end drums, and having the lags bolted across or to them on their outer face, have been employed or proposed in place of an open-link chain, not a separate or distinct rack in addition to the chains, for such, by producing unnecessary complication and increased liability of parts to shake or get loose, are objectionable. This regular pitched cog-gear produces a smoother and better mesh than an open-link gear; but in all the previous end drum arrangements many disadvantages have arisen.

It is desirable, in order to reduce expense and wear, that the pitch of the endless chain should not be finer or links shorter than is necessary to give the requisite flexibility to the chain to turn or travel round the ends of the power, and in so turning and meshing with or into the end drums the links gear badly, as the spaces which separate the links where the links are jointed to each other present or form a varying angle in effecting the turn, which causes a binding or improper impinging action of such gear, or, in other words, produces an irregular mesh, and this is more especially the case where the turn is "quick" or the drums at the ends of the power of moderate diameter, small end drums on this account being altogether inadmissible, for which reason but a comparatively slow revolving driving motion has been practicable under such an arrangement, as the speed of the endless chain or chains is governed by the slow tread of the horse, and a large end cog drum, set in motion by the turn of the chains round it, and forming the revolving driving-power, can only of necessity but make a few revolutions in a minute, compared with the number of revolutions that are required for the purposes. Horse-powers are generally only applicable or wanted such as for driving thrashing-machines, and so forth. Intermediate gear therefore (objectionable both on account of its wear and expense) has been universally adopted in such arrangements of horse-power to get up the required speed on the machine to be driven.

The improvement which forms the novel subject of this specification, while employing the cog-link gear, obviates the necessity for all intermediate gear to get up a quick driving-speed from the slow tread of the horse, and effects the desired motion in a firm but easy manner without causing any irregular mesh of the cog-links at the spaces separating the junction of the links, which links may also, like those before referred to, be made straight, in preference to the well-known objectionable curved or convergent form of endless-chain links operating wheels or drums in horse-powers of the character herein specified and known to be old.

Figure 5:
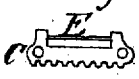

In the power shown in the accompanying drawings the endless cog-chains of the traveling bed or platform, A, Figs. 2, 4 are made up of links C, Figs. 2, 3, 4, and 5 having cogs on their inner edges and projections or catches at the extremities of their outer edge, between which catches planks D, Figs. 2, 4, and 3, are placed, being fitted and secured to the links by rods E, Fig. 5, passing through the catches on the links and through the ends of the planks. These planks form the traveling bed, propelled by the tread of the horse. Cross-axles B, Figs. 4 and 5, connect the links of the two parallel side chains and form the joint-pins of the links of either chain, and, after extending through the links of the two chains, receive on their ends the anti-friction rollers or running wheels F, Figs. 2, 3, and 4, which serve to support the traveling bed or platform, and guide it in its proper course by their running on rails G and H, Figs. 1, 2, and 3, provided with a guard to prevent the wheels F running off the cross-axles B. These rails G and H are secured to the inner side of the frame I, Figs. 1 and 2, the upper rails, G, terminating in a semicircle at each end, around which the endless chains turn, and the running wheels or rollers F passing from the upper to the lower rails, H, as the chains continue to move, the endless chain or chains not passing round any revolving wheel or drum at the ends of the power, but, instead thereof, to convert the straight run of the traveling bed into the required circular movement, there are arranged at some point back of the forward end of the power two small pinions, K, Figs. 1, 2, and 3, on a cross horizontal axle, L, which turns in boxes fast to the two side girts of the frame, and which axle is so situated and the pinions K so placed or set on it that they (the pinions) mesh into the cog-links of the chains on either side, and are caused to revolve by the straight travel of the said cog-links. By this means the cross-axle L, which carries these two pinions, is made the driving-shaft of the power, and motion may be taken from it by pulleys M, arranged on either end. Thus the arrangement of the cog-links of the endless chains, it will be observed, working into the intermediate pinions on either side, as described, gives a simple, flexible, straight rack and pinion gear that operates freely and admits of a much smaller diameter of revolving pinion being operated by the cog-links than by any end drum arrangement, as before specified, and consequently the driving-shaft L of the power is caused to revolve a greater number of times in a minute, thereby avoiding objectionable multiplicity of intermediate gear to get up the before-named essential high or fast driving velocity of the power, while the cog-links of the chains, by this connection of them with the small intermediate pinions, are relieved of those practical objections before adverted to of "binding" or improperly impinging in the mesh of the cog-links with the revolving gear, which takes place at the junction of the links with each other, by the varying angle of the spaces in effecting the turn at the ends of the power in the end cog-drum arrangements before mentioned. The straight rack-gear operation here described not only obviously prevents this, and at the same time admits of a rapid driving velocity, as specified, and without limit as regard the length of the links, but the flexibility of the cog-link racks insures an easy working of the links over and into the small pinions K, which the links of the endless chains, as specified, drive, and the arrangement of the two pinions one on either side of the traveling bed is especially and more particularly serviceable where the driven pinions are intermediate of the ends of the power, as the traveling bed and chains are more subject to vibratory play or shake between than at the ends. The two intermediate pinions, one on either side, prevent or materially lessen, therefore, this midway shake and prevent one-sided action, leaning run, and binding.

What is claimed herein as new and useful in endless-chain horse-powers for driving machinery, and desired to be secured by Letters Patent, is—

The links C of the parallel endless chains, which carry the traveling bed, formed with cogs on their inner edge, meshing into the side pinions, K, on the driving-shaft, when the latter is arranged back of the forward end of the power to receive motion by the straight run of the cog-links over the said pinions, as shown and described.

In testimony whereof we have hereunto subscribed our names.

ALONZO WHEELER.
ALEXANDER F. WHEELER,
*Executor of the last will and testament of William C. Wheeler, deceased.*

Witnesses:
E. S. BEDELL,
J. H. MELRIK.